(12) United States Patent
Kley

(10) Patent No.: US 7,757,485 B2
(45) Date of Patent: Jul. 20, 2010

(54) HYDRODYNAMIC COUPLING

(75) Inventor: Markus Kley, Ellwangen (DE)

(73) Assignee: Voith Turbo GmbH & Co., Heidenheim (DE)

( * ) Notice: Subject to any disclaimer, the term of this patent is extended or adjusted under 35 U.S.C. 154(b) by 1063 days.

(21) Appl. No.: 11/472,666

(22) Filed: Jun. 22, 2006

(65) Prior Publication Data

US 2007/0012037 A1    Jan. 18, 2007

(30) Foreign Application Priority Data

Dec. 22, 2003 (DE) ................................. 103 60 056
Dec. 8, 2004 (WO) ................ PCT/EP2004/013976

(51) Int. Cl.
*F16D 33/00* (2006.01)
(52) U.S. Cl. .............................. 60/330; 60/338; 60/339; 60/608
(58) Field of Classification Search .................. 60/330, 60/338, 339, 608; 416/180, 183; 192/3.29, 192/110 B
See application file for complete search history.

(56) References Cited

U.S. PATENT DOCUMENTS

| | | | |
|---|---|---|---|
| 6,374,601 B1 * | 4/2002 | Sudau ........................... | 60/326 |
| 6,471,021 B1 * | 10/2002 | Sasse et al. ................. | 192/3.29 |
| 6,564,914 B1 * | 5/2003 | Glock et al. ................ | 192/3.29 |
| 6,595,335 B2 * | 7/2003 | Schroder ..................... | 192/3.29 |

FOREIGN PATENT DOCUMENTS

| | | | |
|---|---|---|---|
| DE | 1 400 060 | | 3/1969 |
| DE | 30 47 361 A1 | | 7/1982 |
| DE | 32 12 505 A1 | | 10/1983 |
| DE | 34 34 860 A1 | | 4/1986 |
| DE | 195 16 971 A1 | | 11/1995 |
| DE | 198 33 632 C1 | | 5/1999 |
| DE | 100 15 701 A1 | | 10/2001 |
| DE | 101 20 477 A1 | | 11/2002 |
| DE | 101 63 485 C1 | | 9/2003 |
| EP | 0 995 918 A2 | | 4/2000 |

OTHER PUBLICATIONS

International Search Report dated Apr. 1, 2005 for PCT/EP2004/013976.

* cited by examiner

*Primary Examiner*—Hoang M Nguyen
(74) *Attorney, Agent, or Firm*—Ohlandt, Greeley, Ruggiero & Perle, L.L.P.

(57) ABSTRACT

The invention relates to a hydrodynamic coupling having a primary blade wheel and a secondary blade wheel. The primary wheel and the secondary wheel together form a working chamber that can be filled with a working medium and are mounted in such a way that they can rotate in relation to each other. A bearing is inserted, at least indirectly, between the primary impeller and the secondary impeller, said bearing absorbing the radial forces and/or axial forces acting between the blade wheels. The inventive hydrodynamic coupling is characterized in that the bearing is constructed as a sliding bearing, a film of bearing fluid subjected to hydrostatic pressure being formed between the bearing components moving in relation to each other during the operation of the hydrodynamic coupling, and the pressure of the bearing fluid is dependent on the pressure of the working medium built up in the working chamber.

11 Claims, 2 Drawing Sheets

HYDRODYNAMIC COUPLING

Figure 1:
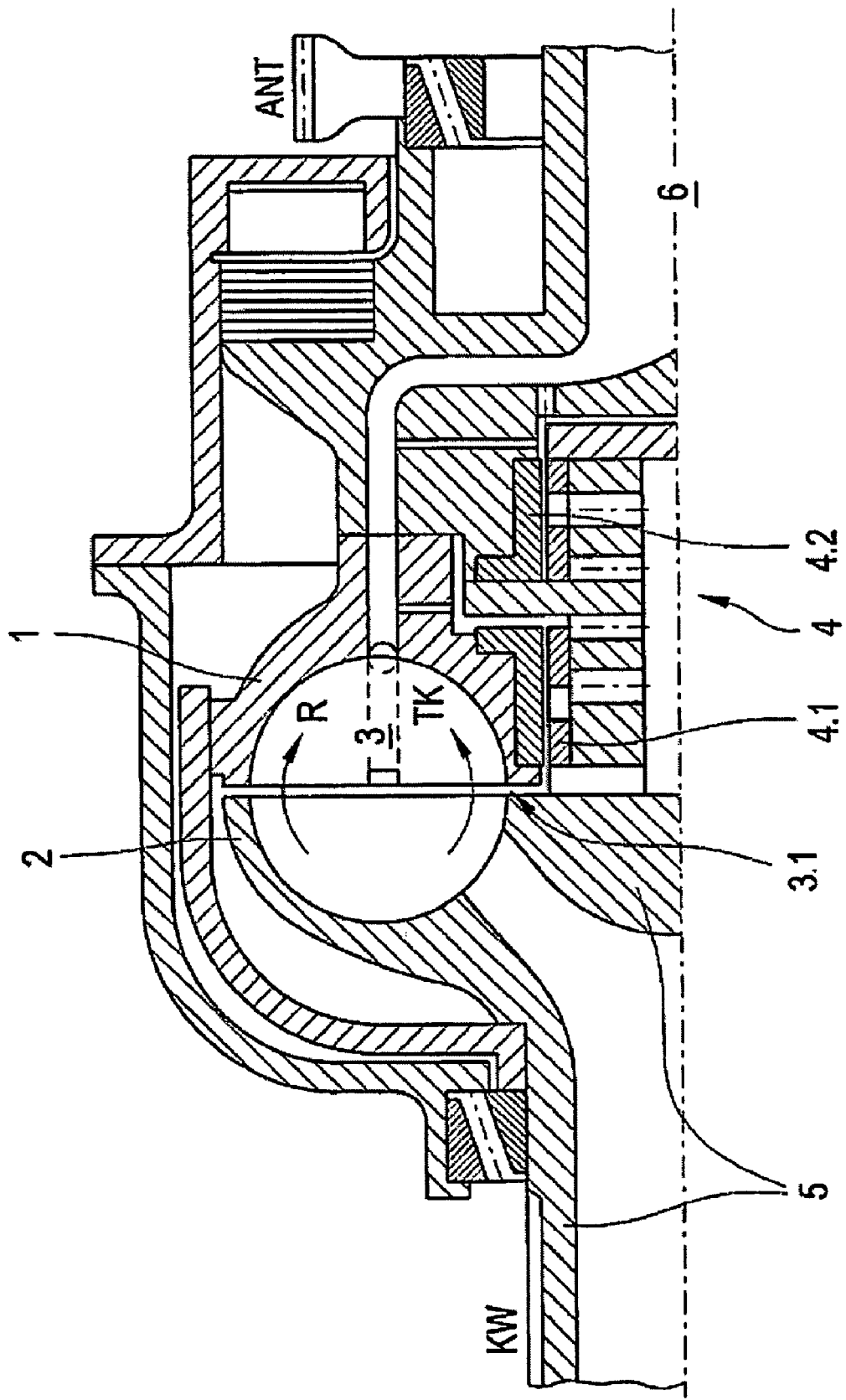

This application claims the benefits of the earlier filing dates of the foreign priority of DE 10360056.6 filed on Dec. 22, 2003, and PCT/EP04/13976 filed on Dec. 8, 2004.

The invention relates to a hydrodynamic coupling and particularly to the bearing arrangement of the blade wheels.

Hydrodynamic couplings are known. They serve to transmit torque from a drive train to a driven train. The drive train is connected with a first blade wheel of the hydrodynamic coupling in a driven connection and the driven train is connected with a second blade wheel. The first blade wheel is referred to, as a rule, as the pump impeller and the second blade wheel as the turbine wheel.

Known is the increasing use of hydrodynamic couplings in so-called turbocompound systems. Such systems relate to a motor vehicle drive train that utilizes exhaust gas energy. Such a motor vehicle drive train comprises an internal combustion engine, in the exhaust gas flow of which an exhaust gas turbine is connected. The internal combustion engine naturally drives a crankshaft. At the same time, the driving power of the exhaust gas turbine is transmitted to the crankshaft. Inserted in the driven connection between the exhaust gas turbine and the crankshaft is a hydrodynamic coupling, which serves, first of all, for transmitting torque from the exhaust gas turbine to the crankshaft. However, as a rule, the hydrodynamic coupling has a second function, namely, that of a hydrodynamic brake. Such a hydrodynamic brake is also known under the term retarder. If the hydrodynamic coupling is to work as a retarder, then one of its two blade wheels is locked mechanically against rotation, namely, the blade wheel that is driven by the exhaust gas turbine in coupling operation. Accordingly, the following operating state results: The crankshaft drives the non-fixed blade wheel, which transmits torque to the fixed blade wheel via the working medium in the working chamber of the hydrodynamic coupling and thus is braked. This leads to a wear-free braking of the crankshaft and thus to the braking of the vehicle.

In such turbocompound systems, it is appropriate not to speak of a pump impeller and a turbine wheel, because, as discussed, at times the one blade wheel is driven and at times the other blade wheel is driven and thus works as a pump. Therefore, it is common to refer to the blade wheel that is in driven connection with the exhaust gas turbine as the primary impeller and to refer to the blade wheel that is in driven connection with the crankshaft as the secondary impeller.

The present invention relates, in particular, to a hydrodynamic coupling that is used in such a turbocompound system or in a corresponding drive train.

The pump impeller and the turbine wheel, or the primary impeller and the secondary impeller, of a hydrodynamic coupling are mounted in the described system in such a way that they can rotate in relation to each other. Here, the bearing is designed in such a way that a single bearing arrangement is provided between the two wheels. This relative bearing, for example, can comprise two ball bearings, as described in the European Patent Application with the publication number EP 0 995 918 A2.

Many attempts have already been made to achieve a bearing that is optimal for the applied purpose. Thus, the cited European patent application is concerned with the lubricant used in such ball bearings. In opposition to earlier designs, the bearings are filled with lubricating grease and sealed to the outside. However, this bearing arrangement, like other bearing arrangements of the prior art, exhibits the feature that it still involves ball bearings or roller bearings.

This has the following background: Obviously, sliding bearing are also known to the designer in the field of hydrodynamic couplings. However, such sliding bearings have thus far been regarded as unsuitable for the bearing of blade wheels of hydrodynamic couplings, particularly in turbocompound systems. In such couplings, on the one hand, substantial radial and especially axial forces arise in many operating states and must be absorbed by the bearing provided. In other operating states, on the other hand, only small forces arise. In addition, the relative rpm varies between the blade wheels, particularly in turbocompound systems. Thus, in turbocoupling operation, it is possible to assume a relative rpm, that is, an rpm difference between the primary impeller and the secondary impeller, of approximately 120 to 360 revolutions per minute. This rpm difference is dependent on the slip of the hydrodynamic coupling and, further, on the engine rpm and the gear ratio between the crankshaft and the hydrodynamic coupling. In retarder operation at 100% slip, by contrast, the relative rpm may amount to 4000 to 12,000 revolutions per minute. Particularly due to the comparatively small relative rpm in coupling operation, basically roller bearings, particularly those using grease lubrication, are more appropriate.

However, the known designs of hydrodynamic couplings suffer the drawback that the roller bearings used are not particularly suitable for operation at high relative rpms, thereby resulting in premature bearing wear.

The invention is based on the problem of presenting a hydrodynamic coupling and, in particular, a drive train having a hydrodynamic coupling, that is improved over the prior art. In particular, the drawbacks described above are to be eliminated.

The inventive problem is solved by a hydrodynamic coupling according to claim 1 and a motor vehicle drive train according to claim 8. The subclaims describe especially advantageous further developments of the invention.

The inventor has succeeded in using a sliding bearing as a relative bearing between the primary impeller and the secondary impeller in contrast to constructions of the prior art. In order to be able to govern securely the varying axial forces in different operating states, without there existing a danger of exceeding the bearing capacity, the bearing pressure of the sliding bearing, that is, the hydrostatic pressure of the bearing fluid, is adjusted as a function of the pressure in the working chamber that is formed by the circulation of the working medium. Especially advantageous here is the use of a portion of the working medium as the bearing fluid, said bearing fluid being carried out of the working chamber into the bearing.

A high pressure exists in the working medium circulation in the working chamber of the hydrodynamic coupling at the outer edge, whereas a low pressure exists in the interior of the toroidal working chamber, in the so-called eye of the retarder. Therefore, in order to be able to attain a high pressure in the sliding bearing for large forces that are to be supported, it is advantageous to tap working medium from the outer edge of the flow circulation that is adjusted in the working chamber. Provided in view of the short carrying path between the working chamber and the sliding bearing is a corresponding tapping opening on, for example, the radially inner circumference of the toroidal working chamber.

According to an advantageous embodiment of the invention, the sliding bearing is a so-called axial/radial bearing, that is, a bearing that absorbs both axial and radial forces. In particular, this sliding bearing is the sole bearing that is provided as a relative bearing between the primary impeller and the secondary impeller.

When a portion of the working medium is provided as the bearing medium, the sliding bearing is advantageously supplied with medium from the retarder circuit, which is subsequently discharged to the inlet channel into the retarder. When the circuit is empty, there could exist the danger that the sliding bearing runs dry.

However, an empty circuit can be reliably avoided by way of a suitable filling control.

The sliding bearing design of the invention makes use of the following knowledge: In retarder operation, during which large forces arise between the primary impeller and the secondary impeller and are to be absorbed via the relative bearing, a high meridian flow speed exists in the working chamber of the hydrodynamic coupling and accordingly a high flow pressure (hydrostatic pressure, particularly at the outer edge of the flow circulation). Because a large pressure is thus also built up in the sliding bearing in accordance with the invention, the sliding bearing is able to absorb large axial forces without any danger that the bearing components, which move in relation to each other, start up.

In coupling operation, by contrast, there exists a comparatively slow meridian flow speed and accordingly a low flow pressure. The axial forces to be absorbed are small. On account of the low pressure in the working chamber, a lower pressure is adjusted in the sliding bearing as well. However, such a pressure is adequate in this operating state, because the axial forces to be absorbed are small.

The invention will be described in greater detail below on the basis of an embodiment example and the associated figures.

Figure 2:
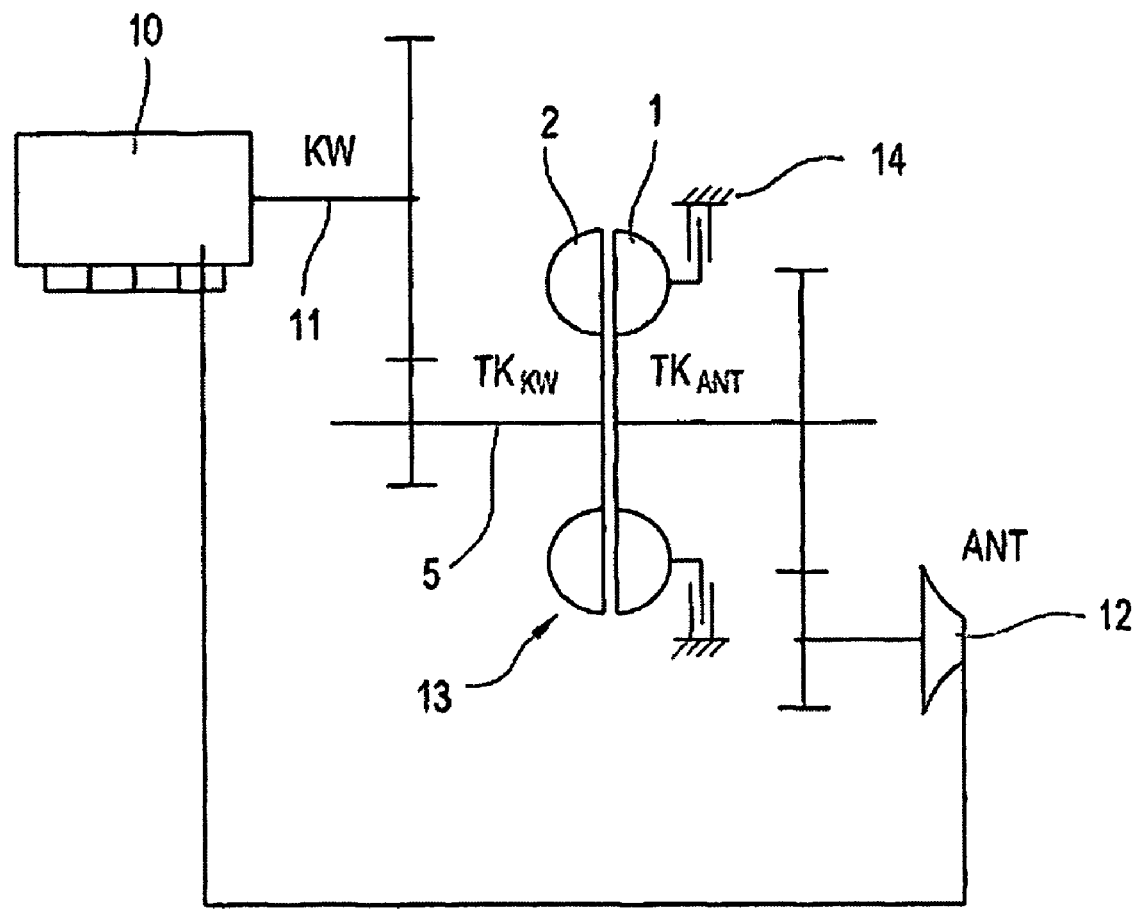

Shown are:

FIG. 1 a hydrodynamic coupling with an inventive sliding bearing;

FIG. 2 the arrangement of a hydrodynamic coupling in a drive train.

FIG. 1 shows an axial section through the essential subregion of a hydrodynamic coupling constructed in accordance with the invention. Evident is the primary blade wheel 1 and the secondary blade wheel 2. The two blade wheels 1 and 2 are arranged opposite each other in such a way that together they form a toroidal working chamber 3. When used in a turbocompound system in coupling operation, the primary impeller 1 is driven, at least indirectly, via an exhaust gas turbine. In accordance therewith, the working medium in the primary impeller 1 is accelerated radially outward and, in the working chamber 3, there is adjusted a circular flow in one direction between the primary impeller 1 and the secondary impeller 2, as indicated by the arrow TK (turbocoupling operation). Torque is transmitted from the primary impeller 1 to the secondary impeller 2 due to the creation of this circular flow.

In retarder operation, the primary impeller 1 is fixed in place, that is, mechanically locked against rotation. The secondary impeller 2 is driven, at least indirectly, by the crankshaft of an engine, so that the working medium in the secondary impeller 2 is accelerated radially outward and a working medium circulation is adjusted in such a direction as shown by the arrow R. The torque transmitted from the secondary impeller 2 to the primary impeller 1 by means of the flow circulation is discharged via a suitable locking mechanism— for example, a multidisc clutch.

In FIG. 1, the abbreviation ANT stands for exhaust gas turbine, the bearing arrangement of which is indicated in FIG. 1 on the right, and the abbreviation KW stands for crankshaft, which, as a rule, is connected through a suitable gearbox on the left side of FIG. 1.

The secondary impeller 2 is constructed integrally with a retarder input shaft 5. The retarder input shaft, which could also be referred to as a coupling driven shaft, is driven—as depicted—by the crankshaft in retarder operation. The secondary impeller 2 is mounted by means of the bearing 4, which is constructed on the retarder input shaft 5. In accordance with the invention, the bearing 4 is a sliding bearing having two bearing components 4.1 and 4.2 that move relative to each other. The first bearing component 4.1 runs at the speed of the retarder input shaft 5 and thus at the speed of the secondary impeller 2. The second bearing component 4.2 runs at the speed of the primary impeller 1.

A film of a bearing medium is formed between the two bearing components during operation. This bearing medium is part of the working medium that is discharged out of the working chamber 3 via the tapping site 3.1, which lies on the radius of the smallest circumference of the working chamber 3. As can be seen, the chosen channel feeding, first radially inward, then in the axial direction into the bearing 4, makes it possible to achieve an extreme short flow path between the working chamber 3 and the bearing 4, which, in turn, leads to a small pressure loss. Subsequently, the working medium flows axially out of the bearing 4, is once again diverted radially inward, and flows out into the inlet channel 6, by means of which working medium is conducted into the working chamber 3.

Shown in FIG. 2 is the arrangement of a corresponding hydrodynamic coupling 13 in a driven connection between a crankshaft 11, which is driven by an internal combustion engine 10, and an exhaust gas turbine 12, which is driven by the exhaust gases of the internal combustion engine 10. The primary impeller 1 of the hydrodynamic coupling can be braked by means of the multidisc clutch 14 and locked against rotation. In this state, the hydrodynamic coupling works as a retarder; that is, the crankshaft 11, which is connected with the retarder input shaft 5 via a gearbox, drives the secondary impeller 2 and is thereby braked.

LIST OF REFERENCE NUMBERS

1 primary impeller
2 secondary impeller
3 working chamber
4 bearing
4.1 first bearing component
4.2 second bearing component
5 retarder input shaft
6 inlet channel
10 internal combustion engine
11 crankshaft
12 exhaust gas turbine
13 hydrodynamic coupling
14 multidisc clutch

The invention claimed is:

1. A motor vehicle drive train, comprising:
an internal combustion engine that drives a crankshaft;
an exhaust gas turbine that can drive said crankshaft; and
a hydrodynamic coupling for selectively coupling said exhaust gas turbine to said crankshaft, said hydrodynamic coupling comprising:
a primary impeller driven by said exhaust gas turbine;
a secondary impeller, said primary and secondary impeller forming a working chamber that can be filled with working medium, said primary and secondary impellers being mounted in such a way that they can rotate in relation to each other;
a first coupling operating mode in which said primary impeller is driven by said exhaust gas turbine and in which said secondary impeller is driven via a flow circulation of said working medium in said working chamber, said primary and secondary impellers rotating at varying revolutions per minute relative to one another and a slip of less than 100% exists in said hydrodynamic coupling;

a retarder operating mode in which said primary impeller is locked mechanically against rotation and said secondary impeller is driven by said crankshaft so that a slip of 100% exists in said hydrodynamic coupling;

a bearing inserted between said primary and secondary impellers, said bearing absorbing radial forces and/or axial forces between said primary and secondary impellers; and a film of bearing fluid being formed between a plurality of bearing components that move in relation to each other during operation of said hydrodynamic coupling, said film of bearing fluid being subjected to hydrostatic pressure.

2. The motor vehicle drive train according to claim 1, wherein said film of bearing fluid is a portion of said working medium that is conducted out of said working chamber and into said bearing.

3. The motor vehicle drive train according to claim 1, wherein said bearing is a sliding bearing.

4. The motor vehicle drive train according to claim 1, wherein said bearing is an axial/radial bearing.

5. The motor vehicle drive train according to claim 2, wherein said portion is tapped from an outer edge of said flow circulation in said working chamber.

6. The motor vehicle drive train according to claim 1, wherein said secondary impeller is mounted in a rotationally fixed manner on a retarder input shaft, and wherein said primary impeller is mounted by means of said bearing on said retarder input shaft so that said primary impeller can rotate with respect to said retarder input shaft.

7. The motor vehicle drive train according to claim 1, wherein said primary impeller is locked mechanically against rotation by a multidisc clutch.

8. The motor vehicle drive train according to claim 1, wherein said working medium is a cooling medium of a motor vehicle cooling circuit.

9. The motor vehicle drive train according to claim 8, wherein said cooling medium is water or a water mixture.

10. A hydrodynamic coupling, comprising:

a primary impeller that can be driven by an exhaust gas turbine;

a secondary impeller, said primary and secondary impeller forming a working chamber that can be filled with working medium, said primary and secondary impellers being mounted in such a way that they can rotate in relation to each other;

a first coupling operating mode in which said primary impeller can be driven by the exhaust gas turbine and in which said secondary impeller is driven via a flow circulation of said working medium in said working chamber, said primary and secondary impellers rotating at varying revolutions per minute relative to one another and a slip of less than 100% exists in said hydrodynamic coupling;

a retarder operating mode in which said primary impeller is locked mechanically against rotation and said secondary impeller is driven by a crankshaft so that a slip of 100% exists in said hydrodynamic coupling;

a bearing inserted between said primary and secondary impellers, said bearing absorbing radial forces and/or axial forces between said primary and secondary blade wheels; and a film of bearing fluid being formed between a plurality of bearing components that move in relation to each other during operation of said hydrodynamic coupling, said film of bearing fluid being subjected to hydrostatic pressure and a pressure of said working medium in said working chamber.

11. The hydrodynamic coupling according to claim 10, wherein said bearing is a single bearing.

* * * * *